(No Model.) 2 Sheets—Sheet 1.
O. HAMMERSTEIN.
APPARATUS FOR CUTTING FILLERS FOR LONG FILLER CIGAR BUNCHES.
No. 428,208. Patented May 20, 1890.
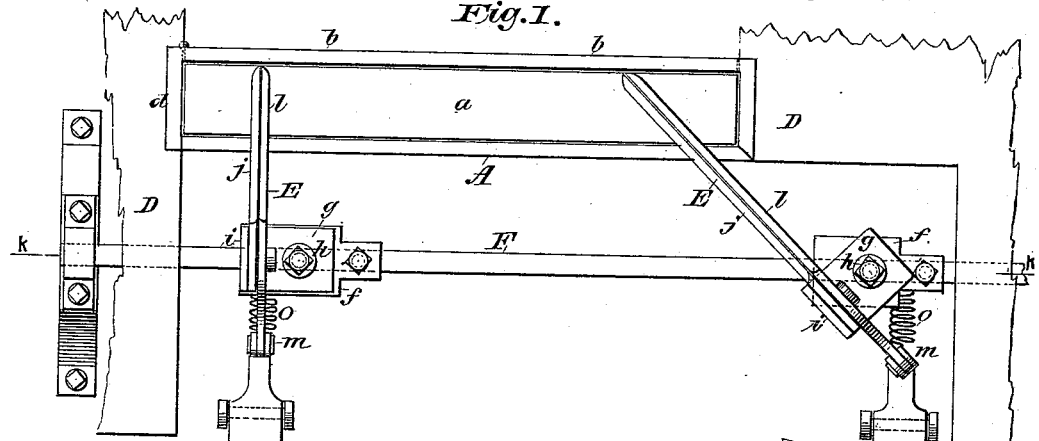
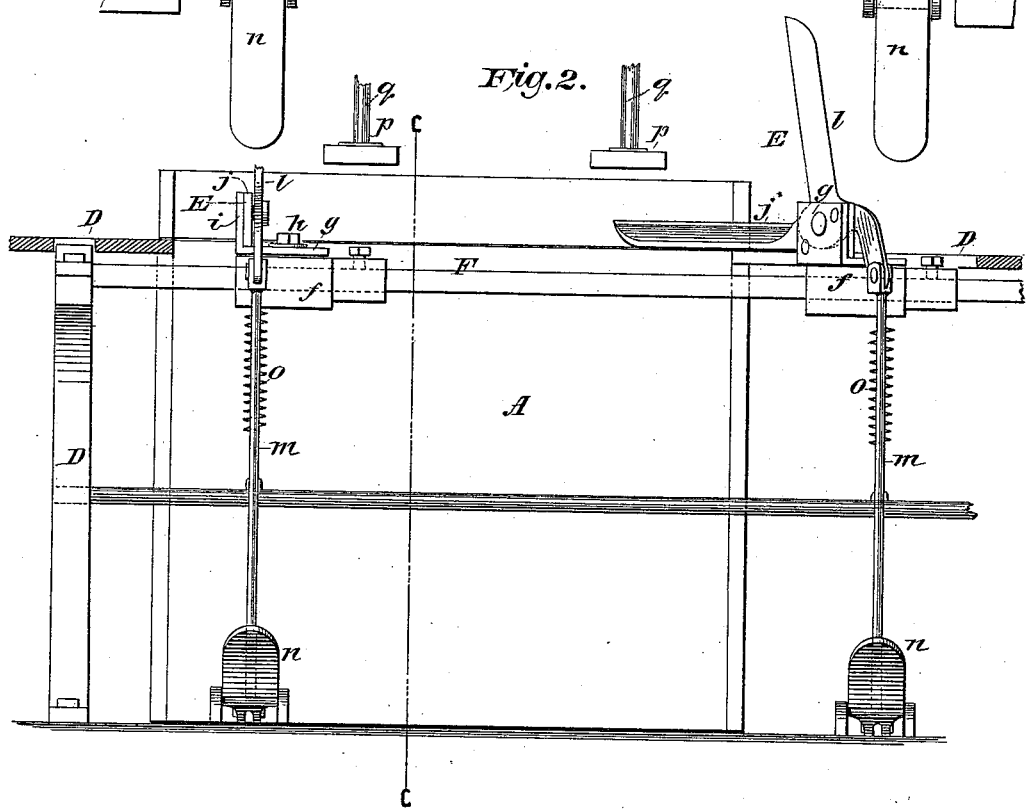

(No Model.) 2 Sheets—Sheet 2.
O. HAMMERSTEIN.
APPARATUS FOR CUTTING FILLERS FOR LONG FILLER CIGAR BUNCHES.
No. 428,208. Patented May 20, 1890.
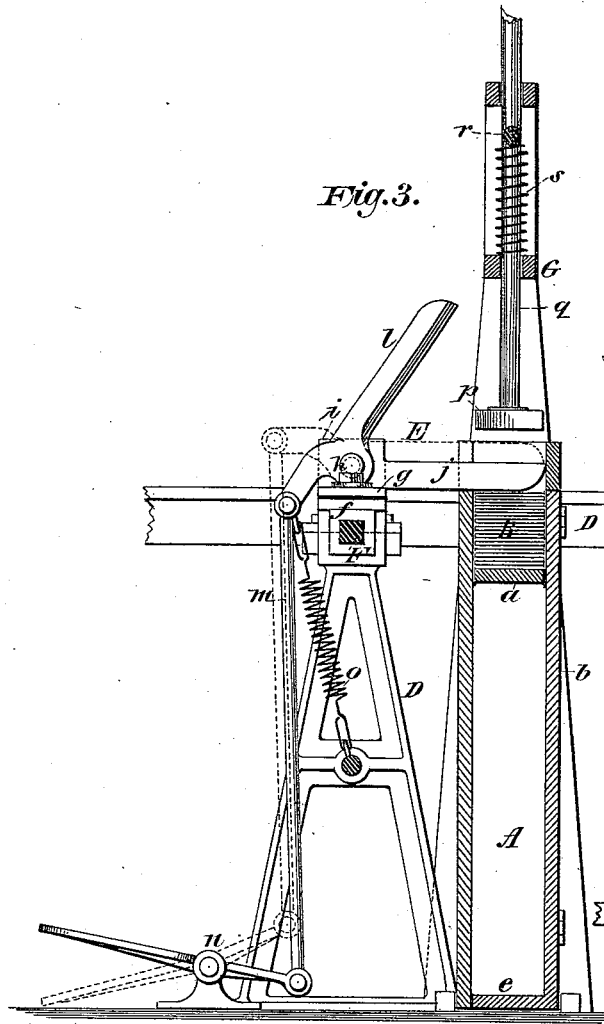
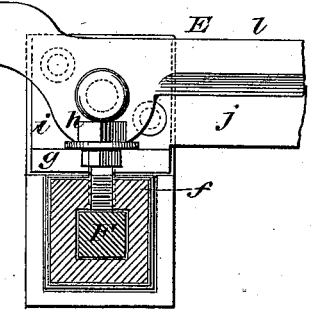
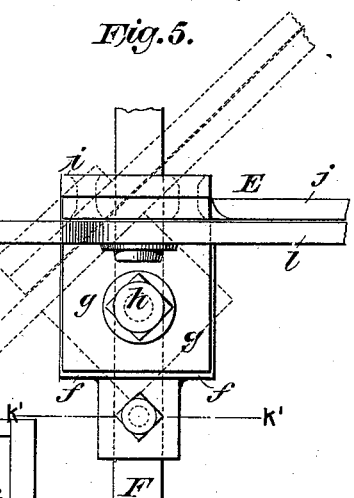
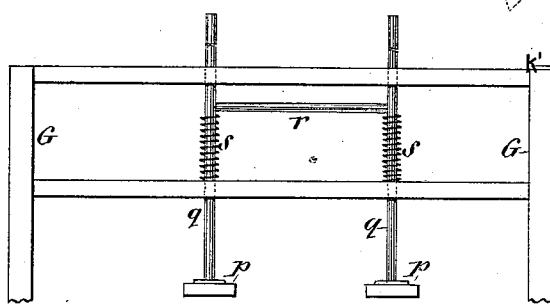
WITNESSES:
Gustave Ditrich
T. F. Bourne
INVENTOR
Oscar Hammerstein
BY
Briesen, Steele & Knauth
ATTORNEYS.

UNITED STATES PATENT OFFICE.

OSCAR HAMMERSTEIN, OF NEW YORK, N. Y.

APPARATUS FOR CUTTING FILLERS FOR LONG-FILLER CIGAR-BUNCHES.

SPECIFICATION forming part of Letters Patent No. 428,208, dated May 20, 1890.

Application filed September 12, 1888. Serial No. 285,184. (No model.)

*To all whom it may concern:*

Be it known that I, OSCAR HAMMERSTEIN, a resident of the city, county, and State of New York, have invented an Improved Apparatus for Cutting Fillers for Long-Filler Cigar-Bunches, of which the following is a specification.

The object of my invention is to provide improved means for forming fillers for long-filler cigar-bunches.

The invention consists in the details of improvement and the combinations of parts, that will be more fully hereinafter set forth.

Reference is to be had to the accompanying drawings, forming part of this specification, in which—

Figure 1 is a top view of the filler-cutting knives and the receptacle for the filler. Fig. 2 is a side elevation thereof, parts being broken away. Fig. 3 is a vertical cross-section of the same on the line *c c*, Fig. 2. Fig. 4 is an enlarged detail sectional side view on the line *k′ k′*, Fig. 5, showing the means for supporting the knives; and Fig. 5 is a top view thereof. Fig. 6 is a detail view of the plungers for pushing the leaves into their receptacle.

In the accompanying drawings, the letter A represents a box or other suitable receptacle, into which the tobacco-leaves to form the filler of a cigar are to be placed. This box, as shown in Fig. 1, is of a width to determine the width of tobacco necessary to form a filler, and it may be, if desired, somewhat longer than the desired length of filler to be made.

The box or receptacle A contains a movable shelf or support *a* to support tobacco within the receptacle. (See Fig. 3.) This shelf may be retained in the desired position by frictional contact with the inner sides of the receptacle A or otherwise, and is adapted to be lowered within said receptacle as the tobacco-leaves B are placed therein. I prefer that one side *b* of the receptacle A should be movable, and for this purpose I pivot or otherwise removably secure said side of the receptacle A to the adjacent side *d*. (See Fig. 1.) The upper end of the receptacle A is to be left open, while the lower end *e* will be closed while the tobacco-leaves B for the filler are being placed in the receptacle. In order to remove the end *e* when the side *b* is removed, I preferably secure the end *e* to the side *b*, so that it may be moved away from the receptacle A in unison with the side *b*.

When the receptacle A is to be filled with tobacco-leaves B, it is placed upon the floor or other support, its end *e* resting upon such support, as in Fig. 3, the receptacle A being placed against a frame or support D, so that shears or knives E may be passed through or over one side thereof. (See Fig. 3.) These shears or knives are shown supported and are operated as follows: The table or frame D is provided with a horizontal rod F, that passes parallel with one side of the receptacle A when said receptacle is placed in position to receive the tobacco-leaves, as in Figs. 1, 2, and 3. Upon the rod F is placed a sleeve *f*, that has longitudinal movement on said rod, and may be secured in proper position either by means of a set-screw or otherwise. On the upper side of the sleeve *f* is placed an angle-plate *g*, that is held on said sleeve *f* by means of a bolt or other screw *h*, that passes through the plate *g* and into the sleeve *f*. The plate *g* is adapted to be turned on the bolt *h*. (See Fig. 1.) To the upwardly-extending part *i* of the angle-plate *g* is secured the lower blade *j* of the knife or shears E. This blade *j* extends horizontally over the upper part of the receptacle A, as shown in Fig. 3. The upper blade *l* of the shears or knife E is pivoted to the blade *j* or to the part *i* of the angle-plate *g*. The blades *j l* of the knife or shears E are adapted to cut tobacco-leaves. The outer or free end of the blade *l* is connected by a rod *m* with a treadle *n*. By depressing the free end of the treadle *n* the cutting-edge of the blade *l* will be lowered to act with the blade *j* to cut tobacco-leaves. A suitable spring *o*, connected to the blade *l* or the rod *m* and also to the frame D, acts to raise the cutting-edge of the blade *l*, as in Fig. 3. It is evident that the knife or shears E may be operated otherwise than by a treadle; also that other forms of knives than that shown may be used for cutting the tobacco-leaves.

As shown in Fig. 1, there are two knives or shears E, having their cutting ends over the receptacle A; but it is evident that one or more such knives may be used. To cut the tobacco-leaves by the above-described devices, the knives are set at such an angle to the length of the receptacle A as to give the desired taper or other cut to the tobacco-leaves. Suppose it is desired that one end of the tobacco-leaves shall be cut straight across, while the opposite end shall be cut with a taper. One of the knives or shears E will be placed straight across the receptacle A, as at the left in Fig. 1, while the other knife will be turned on the pivot $h$ to stand at an angle to such receptacle and be there secured, as shown in Fig. 1. The operator now takes the tobacco-leaves to be cut and lays them over the receptacle A and over the lower stationary blades $j$ of the shears. The treadles are now depressed, which will cause the shears to cut the tobacco-leaves in the desired shape. The part of the leaves so cut that is between the knives or shears will pass down upon the shelf $a$. The operator will then push the leaves, and thereby the shelf $a$, downward to make room for other leaves to be placed on top thereof. He may push these down by his hands, or, if preferred, by means of plungers, which plungers will be seen in Figs. 3 and 6 of the drawings. By turning the knives or shears E on their pivots $h$ in the desired direction tobacco-leaves having any desired taper may be cut, whereby long-filler bunches may be made having more or less taper at one or both ends. In Figs. 3 and 6, G represents a suitable frame that extends above the receptacle A. $p$ are plungers, that are carried by rods $q$, that have their bearings in the cross-bars of the frame G. The rods $q$ are connected by a rod $r$, which may be grasped by the hand of the operator when desired to depress the plunger. The plungers and rods $p$ $q$ are kept elevated above the top of the receptacle A by spiral springs $s$, that surround said rods and that press at one end against a cross-bar of the frame G and at their opposite ends against the bar $r$. By depressing the plungers $p$ after the leaves are cut by the knives or shears said leaves will be passed down into the receptacle A. By this means the leaves in the receptacle A that have been cut to the desired shape by the knives or shears E are compressed somewhat within the receptacle A. The cutting operation is continued until the receptacle A is filled with tobacco-leaves. These tobacco-leaves will be close together and in a somewhat compact mass. In order to form the filler for a cigar of the desired thickness out of these long-filler leaves so cut and packed, as above described, the leaves should be cut off in bunches of the required thickness.

Where in this specification I refer to the part $a$ as a shelf, I mean such a device as will support tobacco-leaves within the receptacle A and permit them to be depressed within the same as more are inserted.

Having now described my invention, what I claim is—

1. The combination, with an open-ended receptacle adapted to receive tobacco-leaves and of about the width of a cigar, of a cutter held obliquely over the open end of said receptacle to cut tobacco to the taper desired, the tobacco after being cut descending into said receptacle beneath the cutter, substantially as described.

2. The combination, with a receptacle adapted to receive tobacco-leaves and of about the width of a cigar, of a swiveled cutter at the upper part of said receptacle and adapted to be turned relatively to said receptacle, so as to cut tobacco in a taper while it is held longitudinally over the receptacle, substantially as described.

3. The combination, with a receptacle adapted to receive tobacco-leaves and of about the width of a cigar, of a swiveled cutter at the upper part of said receptacle, said cutter having lateral movement along the receptacle, substantially as described.

4. The combination, with a receptacle having an interior movable shelf $a$, of a cutter held obliquely above said receptacle, adapted to cut tobacco to the taper desired when the tobacco is held longitudinally over the receptacle, substantially as described.

5. The combination, with a receptacle adapted to receive tobacco-leaves and of about the width of a cigar, of a swiveled and laterally-movable cutter at the upper part of said receptacle for cutting a tapering edge on tobacco-leaves when they are held longitudinally over the receptacle, substantially as described.

6. The combination of the receptacle A, having an interior movable shelf $a$, with a cutter at the upper part of the receptacle and projecting over the same, and a swiveled support or plate for said cutter, and with means, substantially as described, for supporting said swiveled plate, substantially as described.

7. The receptacle A, having movable shelf $a$, combined with a cutter at the upper part of said receptacle, a swiveled support for said cutter, a sleeve $f$, carrying said swiveled support, and a rod F for the sleeve, substantially as described.

8. The receptacle A, having the interior movable shelf $a$, combined with a swiveled and laterally-movable cutter at the upper part of the receptacle, and of plungers for pressing the material cut by the cutter down into the receptacle, substantially as described.

9. In a filler-cutter, a set of knives or shears, combined with means, substantially as described, for adjusting them at varying angles to each other, and with a tobacco-receptacle A, over which the knives project, substantially as described.

10. In a filler-cutter, a set of knives or shears, combined with means, substantially as described, for adjusting them at varying angles to each other and laterally, and with a receptacle for tobacco, over which the knives project, substantially as described.

OSCAR HAMMERSTEIN.

Witnesses:
MAURICE BLOCH,
HARRY M. TURK.